United States Patent
Brown

(10) Patent No.: US 11,365,054 B2
(45) Date of Patent: Jun. 21, 2022

(54) SHEET CARRIER STAND APPARATUS

(71) Applicant: Douglas K Brown, Lancaster, KY (US)

(72) Inventor: Douglas K Brown, Lancaster, KY (US)

( * ) Notice: Subject to any disclaimer, the term of this patent is extended or adjusted under 35 U.S.C. 154(b) by 222 days.

(21) Appl. No.: 16/781,740

(22) Filed: Feb. 4, 2020

(65) Prior Publication Data

US 2021/0239266 A1 Aug. 5, 2021

(51) Int. Cl.
*B65G 7/12* (2006.01)
*F16M 11/38* (2006.01)
*F16M 13/06* (2006.01)
*F16M 13/04* (2006.01)

(52) U.S. Cl.
CPC .............. *B65G 7/12* (2013.01); *F16M 11/38* (2013.01); *F16M 13/04* (2013.01); *F16M 13/06* (2013.01)

(58) Field of Classification Search
CPC .......... B65G 7/12; F16M 11/38; F16M 13/04; F16M 13/06
USPC .................................... 294/15, 142
See application file for complete search history.

(56) References Cited

U.S. PATENT DOCUMENTS

| | | | | |
|---|---|---|---|---|
| 2,930,583 A * | 3/1960 | Noe | ......................... | B65G 7/12 254/113 |
| 3,093,387 A * | 6/1963 | O'Neill | ..................... | B62B 3/02 280/47.12 |
| 4,098,442 A | 7/1978 | Moore | | |
| 4,135,655 A | 1/1979 | Brown | | |
| D255,317 S * | 6/1980 | Slinkard | ......................... | 294/137 |
| D288,276 S * | 2/1987 | Harney | ............................. | 294/15 |
| 4,695,085 A * | 9/1987 | Cassels | ..................... | B65G 7/12 294/15 |
| 4,888,846 A * | 12/1989 | Natale | .................... | A47L 13/022 15/236.01 |
| 5,069,495 A * | 12/1991 | Mears | ....................... | B65G 7/12 294/15 |
| 5,257,843 A * | 11/1993 | Nunn | ........................ | B65G 7/12 294/15 |
| 5,639,138 A * | 6/1997 | Smith | ......................... | A47F 5/08 294/142 |
| 6,478,352 B1 * | 11/2002 | Fredrickson | ............. | B65G 7/12 294/15 |
| 9,862,576 B2 | 1/2018 | Stelmach | | |
| 2003/0193203 A1 | 10/2003 | DuBois | | |
| 2012/0111906 A1 | 5/2012 | SanFilippo | | |

FOREIGN PATENT DOCUMENTS

WO WO0138112 5/2001

* cited by examiner

*Primary Examiner* — Dean J Kramer

(57) ABSTRACT

A sheet carrier stand apparatus for carrying and supporting sheet material includes a handle including a handle frame and a grip portion. An extension body is coupled to the handle and has an extension proximal end coupled to the handle frame, an extension distal end, an extension inner side, and an extension outer side. A kickstand is coupled to the extension body. The kickstand has a kickstand proximal end pivotably coupled to the extension outer side and a kickstand distal end lying adjacent the extension distal end with the kickstand in a folded position. The kickstand pivots away from the extension body to an extended position. A cradle has a back lip coupled to the extension inner side adjacent the extension distal end, a cradle bottom perpendicularly extending from the back lip, and a front lip perpendicularly extending from the cradle bottom.

10 Claims, 6 Drawing Sheets

SHEET CARRIER STAND APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to sheet carrier devices and more particularly pertains to a new sheet carrier device for carrying and supporting sheet material.

(2) Description of Related Art Including Information Disclosed Under 37 CFR 1.97 and 1.98

The prior art relates to sheet carrier devices. Existing devices assist users in carrying sheets but do not provide a means to support the sheets upright. Existing devices also fail to provide adequate and variable support at the bottom of the sheets to prevent damage and slippage depending on the material being carried.

BRIEF SUMMARY OF THE INVENTION

An embodiment of the disclosure meets the needs presented above by generally comprising a handle including a handle frame and a grip portion. An extension body is coupled to the handle and has an extension proximal end coupled to the handle frame, an extension distal end, an extension inner side, and an extension outer side. A kickstand is coupled to the extension body. The kickstand has a kickstand proximal end pivotably coupled to the extension outer side and a kickstand distal end lying adjacent the extension distal end with the kickstand in a folded position. The kickstand pivots away from the extension body to an extended position. A cradle has a back lip coupled to the extension inner side adjacent the extension distal end, a cradle bottom perpendicularly extending from the back lip, and a front lip perpendicularly extending from the cradle bottom.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
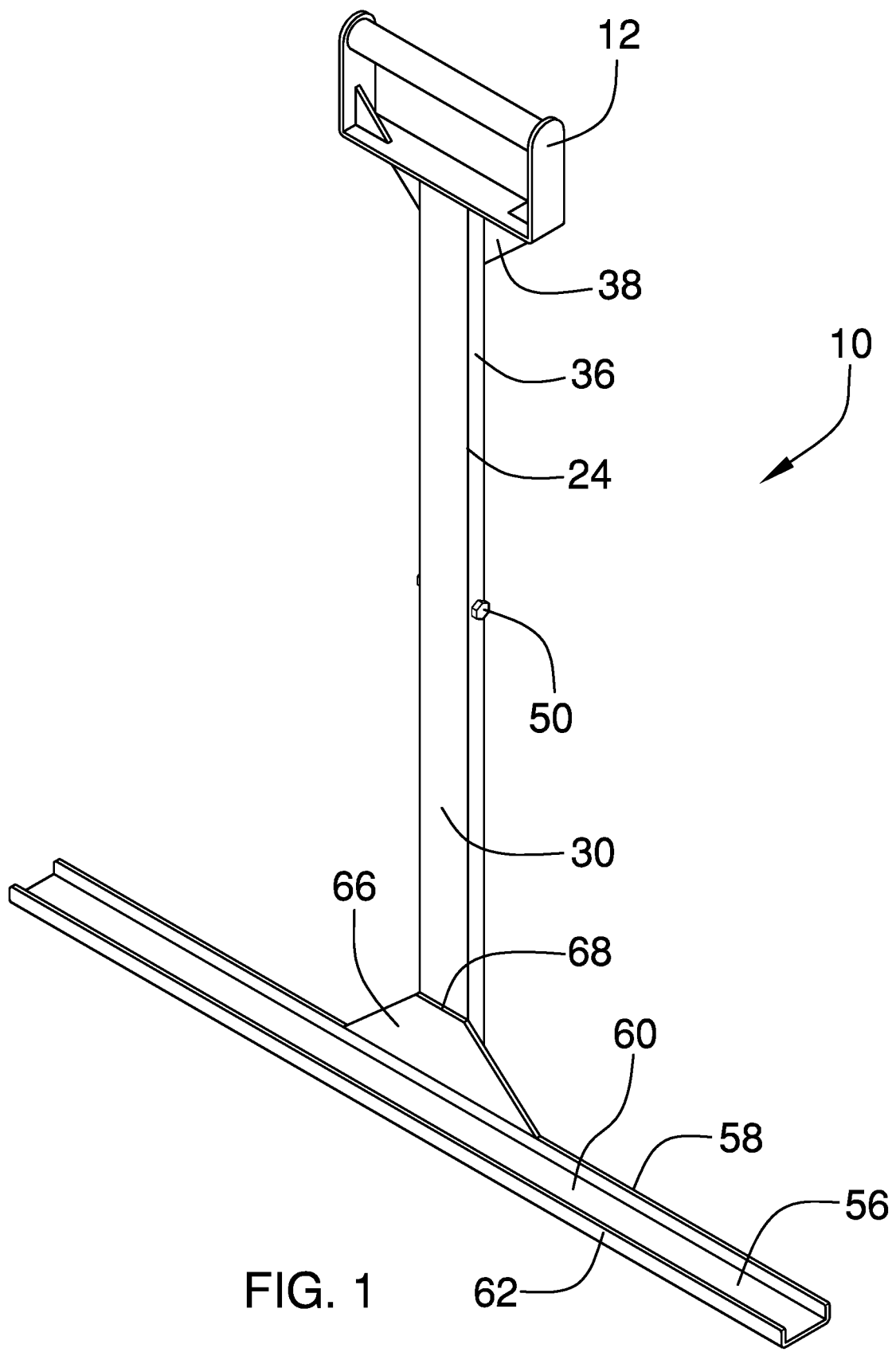
FIG. 1 is an isometric view of a sheet carrier stand apparatus according to an embodiment of the disclosure.
Figure 2:
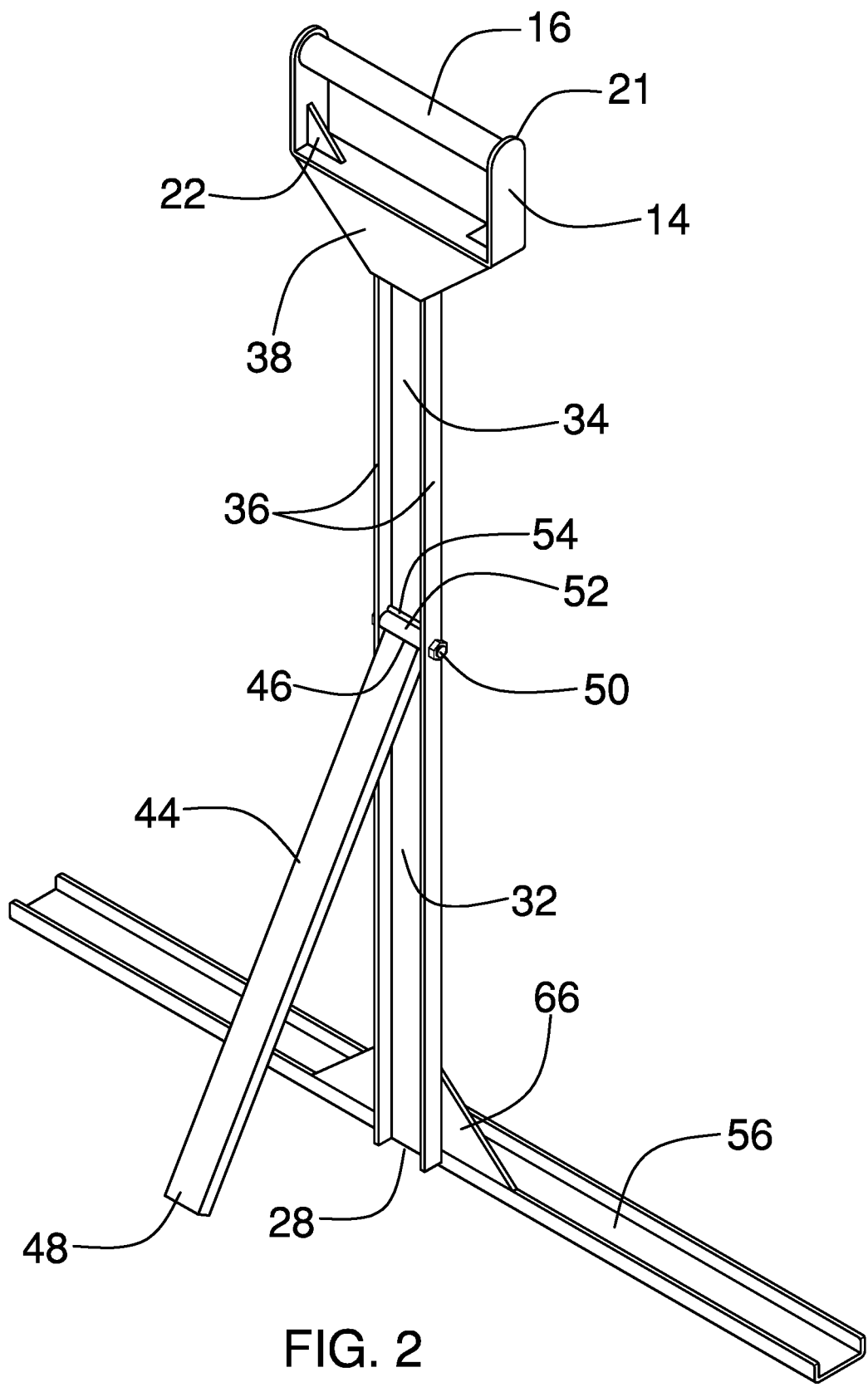
FIG. 2 is an isometric view of an embodiment of the disclosure.
Figure 3:
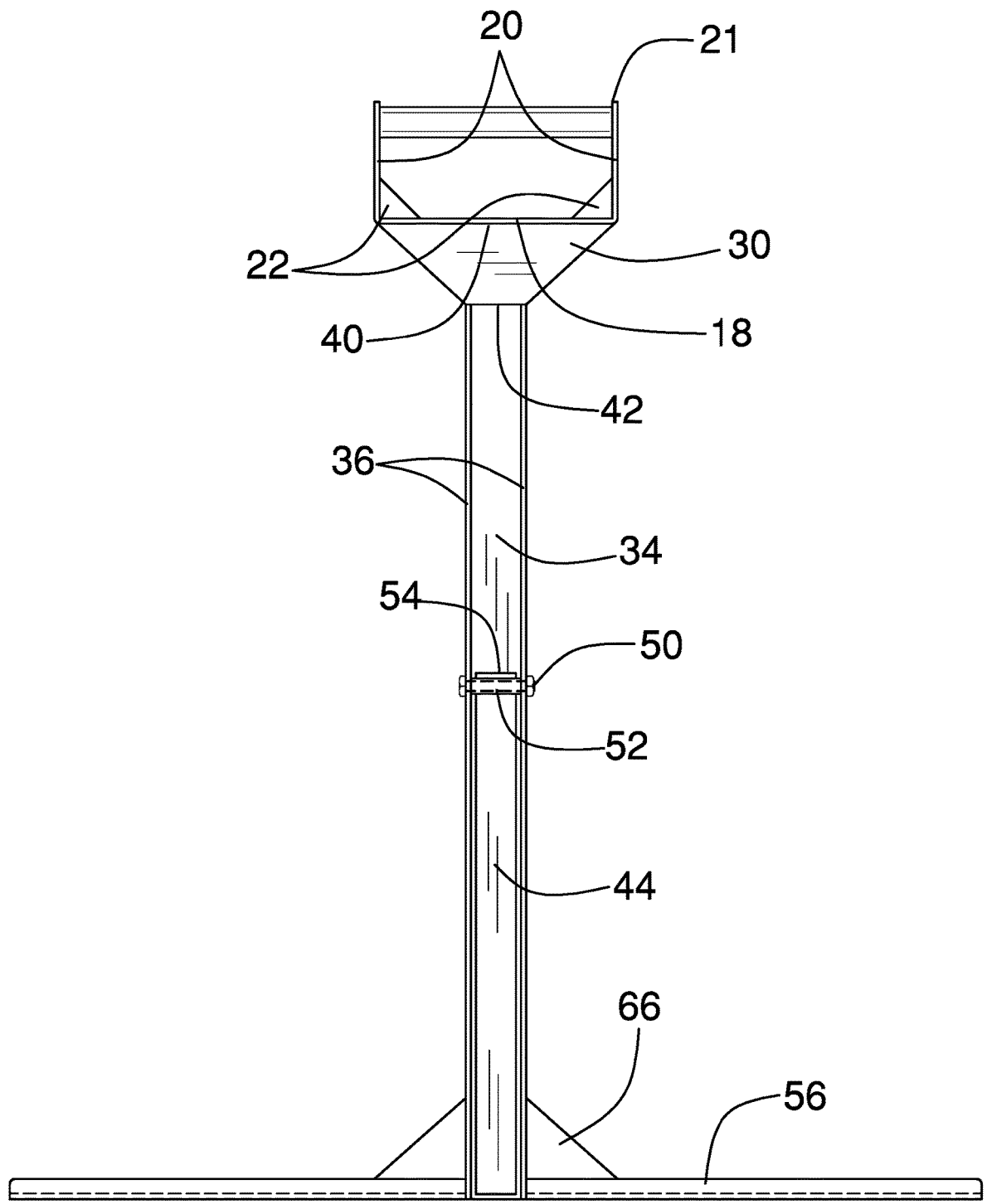
FIG. 3 is a rear elevation view of an embodiment of the disclosure.
Figure 4:
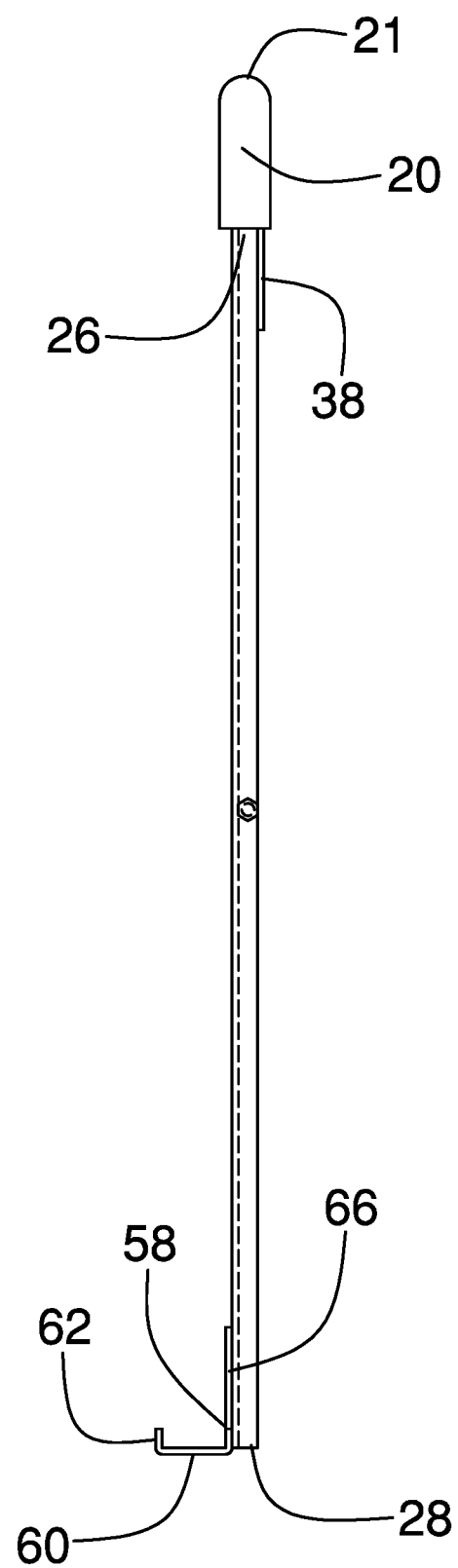
FIG. 4 is a side elevation view of an embodiment of the disclosure.
Figure 5:
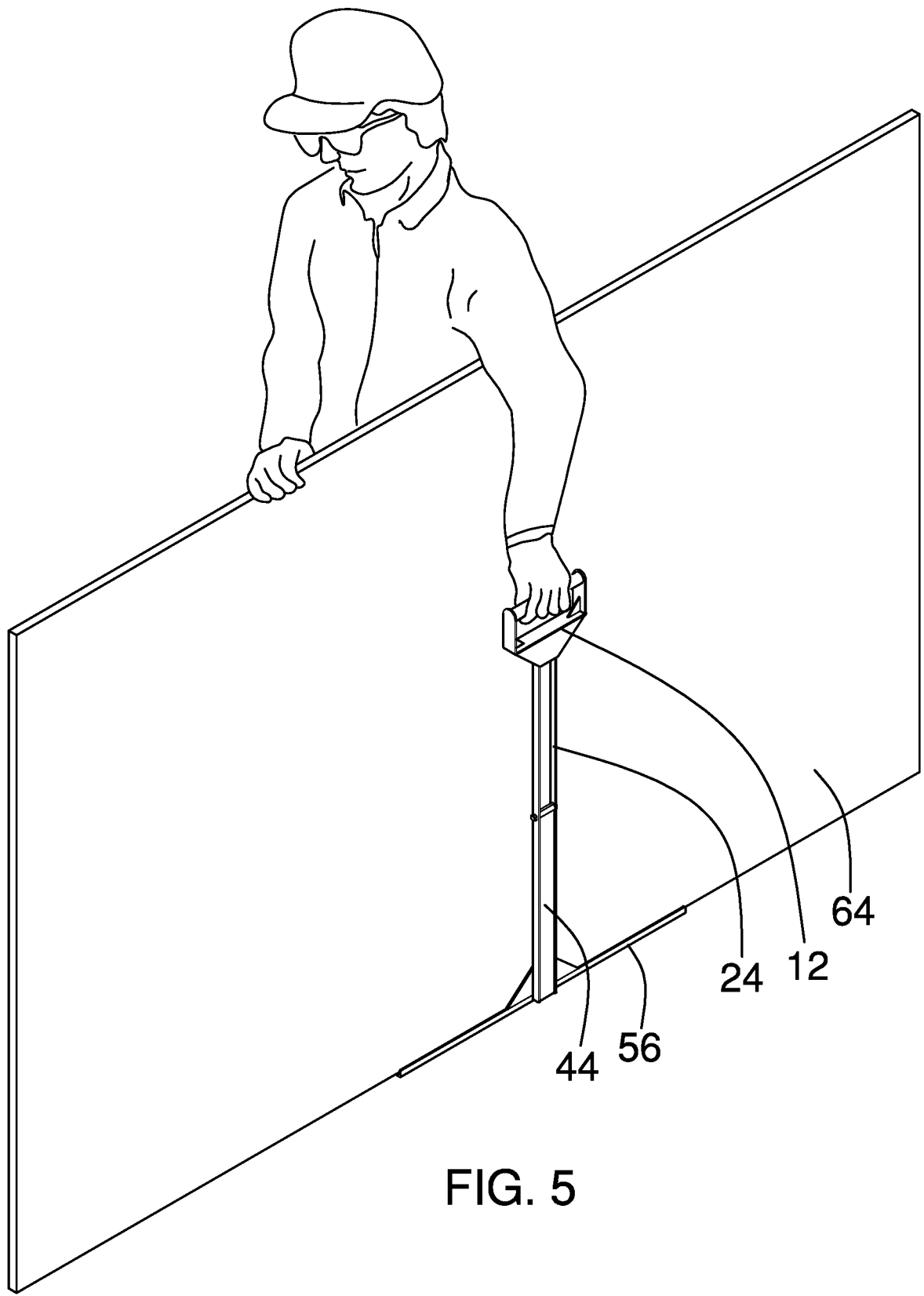
FIG. 5 is an in-use view of an embodiment of the disclosure.
Figure 6:
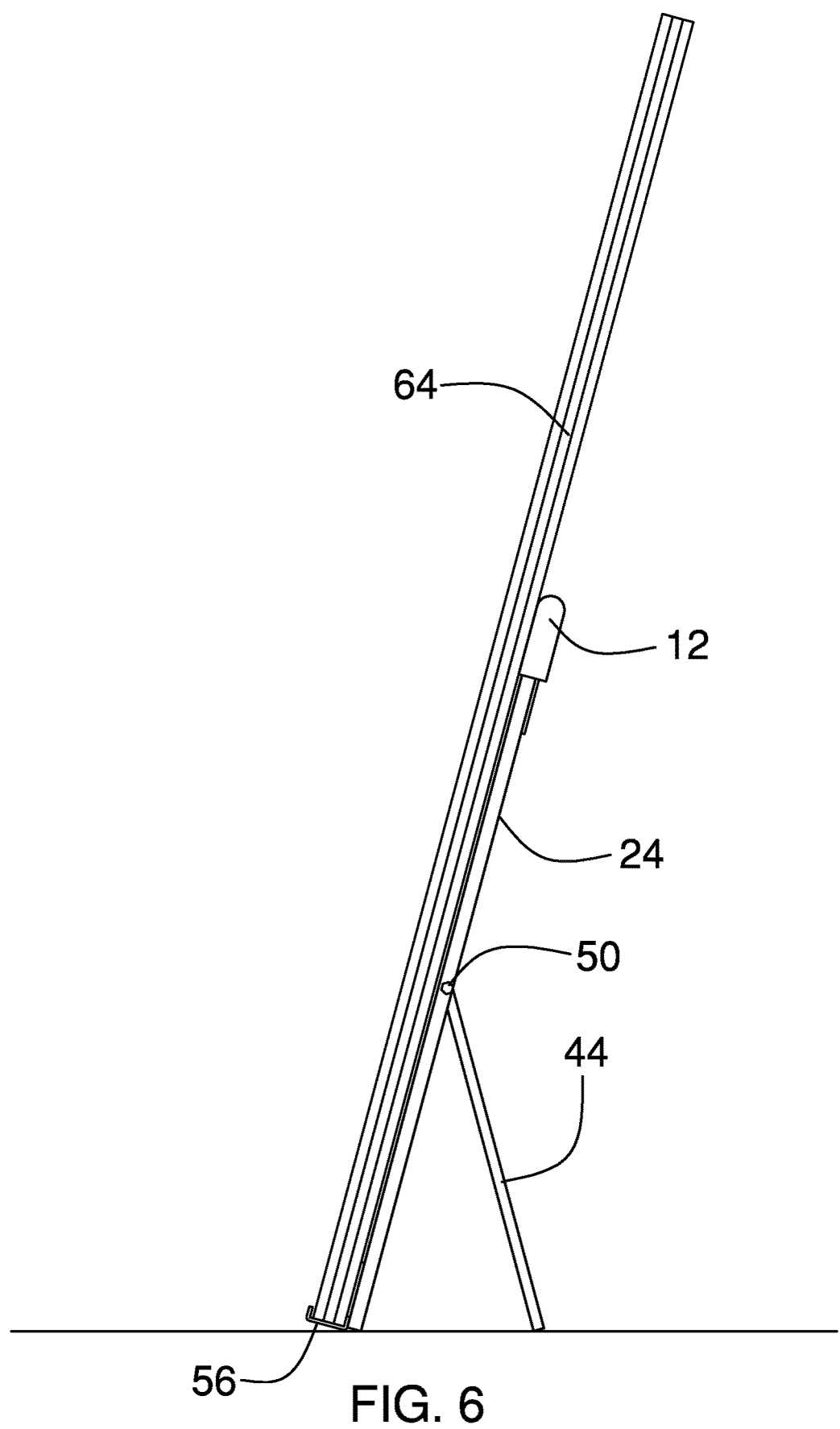
FIG. 6 is an in-use view of an embodiment of the disclosure.

With reference now to the drawings, and in particular to FIGS. 1 through 6 thereof, a new sheet carrier device embodying the principles and concepts of an embodiment of the disclosure and generally designated by the reference numeral 10 will be described.

As best illustrated in FIGS. 1 through 6, the sheet carrier stand apparatus 10 generally comprises a handle 12 including a handle frame 14 and a grip portion 16. The handle frame 14 may include a frame bottom 18 and a pair of frame posts 20 perpendicularly extending from the frame bottom 18. The handle frame 14 may include a pair of triangular gussets 22 coupled between the frame bottom 18 and the frame posts 20. The grip portion 16 may be cylindrical and extends between the frame posts 20. The frame posts 20 may be wider than the grip portion 16 to protect the user's hand. A frame top 21 of each frame post 20 may be rounded to prevent user discomfort.

An extension body 24 is coupled to the handle 12. The extension body 24 has an extension proximal end 26 coupled to the handle frame 14, an extension distal end 28, an extension inner side 30, and an extension outer side 32. The extension body 24 may be C-channel bar comprising a main face 34 and a pair of sidewalls 36 perpendicularly extending from the main face 34 on the extension outer side 32. A handle support 38 may be coupled to the handle frame 14 and the extension body 24. The handle support 38 may be trapezoidal with a handle support top side 40 conforming to the width of the handle frame 14 and a handle support bottom side 42 conforming to the width of the extension body 24.

A kickstand 44 is coupled to the extension body 24. The kickstand 44 has a kickstand proximal end 46 pivotably coupled to the extension outer side 32 and a kickstand distal end 48 lying adjacent the extension distal end 28 with the kickstand 44 in a folded position. The kickstand proximal end 46 may include a pivot rod 50 extending between the sidewalls 36 and a sleeve portion 52 coupled around the pivot rod 50. The pivot rod 50 may be a bolt and nut. The kickstand 44 rests between the sidewalls 36 in the folded position to create a streamlined profile of the apparatus 10. The kickstand 44 pivots away from the extension body 24 to an extended position. The kickstand proximal end 46 may include a pivot stop 54 coupled to the sleeve portion 52. The pivot stop 54 may continuously extend along the length of the sleeve portion 52. The pivot stop 54 limits the angle between the kickstand 44 and the extension body 24 in the extended position. The limited angle may be 9°, 12°, or 15°.

A cradle 56 is coupled to the extension body 24. The cradle 56 may have a back lip 58 coupled to the extension inner side 30 adjacent the extension distal end 28. A cradle bottom 60 perpendicularly extends from the back lip 58 and a front lip 62 perpendicularly extending from the cradle bottom 60. The distance between the back lip 58 and the front lip 62 may be configured to hold three ¾" sheets of material 64. A cradle support 66 may be coupled to the cradle 56 and the extension body 24 to reinforce the cradle 56. The cradle support 66 may be trapezoidal and coupled to the extension inner side 30 and a cradle support top side 68 conforming to the width of the extension body 24.

In use, the material 64 is placed on the cradle 56. The user reaches over the material 64 to secure the handle 12 and lift the apparatus 10. When the apparatus 10 is placed on the ground the kickstand 44 is moved to the extended position to support the material 64.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A sheet carrier stand apparatus comprising:
    a handle including a handle frame and a grip portion;
    an extension body coupled to the handle, the extension body having an extension proximal end coupled to the handle frame, an extension distal end, an extension inner side, and an extension outer side, the extension body being C-channel bar comprising a main face and a pair of sidewalls perpendicularly extending from the main face on the extension outer side;
    a kickstand coupled to the extension body, the kickstand having a kickstand proximal end pivotably coupled to the extension outer side and a kickstand distal end lying adjacent the extension distal end with the kickstand in a folded position, the kickstand pivoting away from the extension body to an extended position; and
    a cradle coupled to the extension body, the cradle having a back lip coupled to the extension inner side adjacent the extension distal end, a cradle bottom perpendicularly extending from the back lip, and a front lip perpendicularly extending from the cradle bottom.

2. The sheet carrier stand apparatus of claim 1 further comprising the kickstand proximal end including a pivot rod extending between the sidewalls and a sleeve portion coupled around the pivot rod, the kickstand resting between the sidewalls in the folded position.

3. The sheet carrier stand apparatus of claim 2 further comprising the kickstand proximal end including a pivot stop coupled to the sleeve portion, the pivot stop limiting the angle between the kickstand and the extension body in the extended position.

4. The sheet carrier stand apparatus of claim 1 further comprising the handle frame including a frame bottom and a pair of frame posts perpendicularly extending from the frame bottom, the grip portion being cylindrical and extending between the frame posts.

5. The sheet carrier stand apparatus of claim 4 further comprising the handle frame including a pair of triangular gussets coupled between the frame bottom and the frame posts.

6. The sheet carrier stand apparatus of claim 1 further comprising a handle support coupled to the handle frame and the extension body.

7. The sheet carrier stand apparatus of claim 1 further comprising a cradle support coupled to the cradle and the extension body.

8. The sheet carrier stand apparatus of claim 7 further comprising the cradle support being trapezoidal, the cradle support being coupled to the extension inner side and a cradle support top side conforming to the width of the extension body.

9. A sheet carrier stand apparatus comprising:
    a handle including a handle frame and a grip portion;
    an extension body coupled to the handle, the extension body having an extension proximal end coupled to the handle frame, an extension distal end, an extension inner side, and an extension outer side;
    a handle support coupled to the handle frame and the extension body;
    a kickstand coupled to the extension body, the kickstand having a kickstand proximal end pivotably coupled to the extension outer side and a kickstand distal end lying adjacent the extension distal end with the kickstand in a folded position, the kickstand pivoting away from the extension body to an extended position;
    a cradle coupled to the extension body, the cradle having a back lip coupled to the extension inner side adjacent the extension distal end, a cradle bottom perpendicularly extending from the back lip, and a front lip perpendicularly extending from the cradle bottom; and
    the handle support being trapezoidal, a handle support top side conforming to the width of the handle frame and a handle support bottom side conforming to the width of the extension body.

10. A sheet carrier stand apparatus comprising:
    a handle including a handle frame and a grip portion, the handle frame including a frame bottom and a pair of frame posts perpendicularly extending from the frame bottom, the handle frame including a pair of triangular gussets coupled between the frame bottom and the frame posts, the grip portion being cylindrical and extending between the frame posts;

an extension body coupled to the handle, the extension body having an extension proximal end coupled to the handle frame, an extension distal end, an extension inner side, and an extension outer side, the extension body being C-channel bar comprising a main face and a pair of sidewalls perpendicularly extending from the main face on the extension outer side;

a handle support coupled to the handle frame and the extension body, the handle support being trapezoidal, a handle support top side conforming to the width of the handle frame and a handle support bottom side conforming to the width of the extension body;

a kickstand coupled to the extension body, the kickstand having a kickstand proximal end pivotably coupled to the extension outer side and a kickstand distal end lying adjacent the extension distal end with the kickstand in a folded position, the kickstand proximal end including a pivot rod extending between the sidewalls and a sleeve portion coupled around the pivot rod, the kickstand resting between the sidewalls in the folded position, the kickstand pivoting away from the extension body to an extended position, the kickstand proximal end including a pivot stop coupled to the sleeve portion, the pivot stop limiting the angle between the kickstand and the extension body in the extended position;

a cradle coupled to the extension body, the cradle having a back lip coupled to the extension inner side adjacent the extension distal end, a cradle bottom perpendicularly extending from the back lip, and a front lip perpendicularly extending from the cradle bottom; and a cradle support coupled to the cradle and the extension body, the cradle support being trapezoidal, the cradle support being coupled to the extension inner side and a cradle support top side conforming to the width of the extension body.

* * * * *